(12) United States Patent
Fujishiro

(10) Patent No.: US 10,375,532 B2
(45) Date of Patent: Aug. 6, 2019

(54) RADIO TERMINAL AND NETWORK APPARATUS

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/039,830

(22) Filed: Jul. 19, 2018

(65) Prior Publication Data

US 2018/0352389 A1 Dec. 6, 2018

Related U.S. Application Data

(63) Continuation of application No. PCT/JP2017/001796, filed on Jan. 19, 2017.

(30) Foreign Application Priority Data

Jan. 21, 2016 (JP) .................. 2016-010123

(51) Int. Cl.
*H04W 4/06* (2009.01)
*H04W 52/02* (2009.01)
*H04W 76/28* (2018.01)
*H04W 76/27* (2018.01)
*H04W 72/04* (2009.01)

(52) U.S. Cl.
CPC ............. *H04W 4/06* (2013.01); *H04W 52/02* (2013.01); *H04W 72/042* (2013.01); *H04W 76/27* (2018.02); *H04W 76/28* (2018.02); *Y02D 70/126* (2018.01); *Y02D 70/1242* (2018.01); *Y02D 70/1262* (2018.01); *Y02D 70/20* (2018.01); *Y02D 70/21* (2018.01); *Y02D 70/24* (2018.01)

(58) Field of Classification Search
CPC ....... H04W 4/06; H04W 76/27; H04W 76/28; H04W 72/042
See application file for complete search history.

(56) References Cited

U.S. PATENT DOCUMENTS

2010/0272004 A1* 10/2010 Maeda .................. H04L 5/0007
370/312
2016/0044578 A1* 2/2016 Vajapeyam ....... H04W 52/0216
370/252

OTHER PUBLICATIONS

SC-PTM configuration and operation, 3GPP TSG-RAN WG 2 meeting # 91 R2-153378 Huawei HiSilicon (Year: 2015).*
Hyper-SFN paging procedures for eDRX, 3GPP TSG-RAN WG2 meeting # 91 R2-154846 Qualcomm (Year: 2015).*
Huawei et al.; SC-PTM further enhancements; 3GPP TSG RAN Meeting #70; RP-151900; Dec. 7-10, 2015; 10 pages; Sitges, Spain.
Huawei et al.; SC-PTM configuration and operation; 3GPP TSG-RAN WG2 Meeting # 91; R2-153378; Aug. 28, 2015; 6 pages; Beijing, China.

(Continued)

*Primary Examiner* — Rina C Pancholi
(74) *Attorney, Agent, or Firm* — Studebaker & Brackett PC

(57) ABSTRACT

A radio terminal according to an embodiment includes a controller configured to perform a discontinuous reception (DRX) operation for multimedia broadcast multicast service (MBMS) transmission. The controller performs the DRX operation by using an MBMS reception opportunity based on hyper system frame number (H-SFN).

3 Claims, 10 Drawing Sheets

(56) References Cited

OTHER PUBLICATIONS

Interdigital Communications; Handling of a 5. 12s eDRX cycle; 3 GPP TSG-SA2 Meeting # 113; S2-160273; Jan. 19, 2016; 2 pages; Saint Kitts, Saint Kitts and Nevis.
Huawei; Introduction of NB-IoT; 3GPP TSG-RAN WG2 NB-IOT Adhoc Meeting; R2-160429; Jan. 13, 2016; 6 pages; Budapest, Hungary.
Ericsson, Qualcomm Incorporated, "Introducing Extended Idle mode DRX", 3GPP SA WG2 Meeting #111, S2-153613, Oct. 19-23, 2015, Chengdu, P. R. China.
Qualcomm Incorporated, "Hyper-SFN paging procedures for eDRX", 3GPP TSG-RAN WG2 Meeting #91bis, R2-154846, Oct. 5-9, 2015, Malmo, Sweden.

* cited by examiner

RADIO TERMINAL AND NETWORK APPARATUS

CROSS-REFERENCE TO RELATED APPLICATION

The present application is a continuation based on PCT Application No. PCT/JP2017/001796 filed on Jan. 19, 2017, which claims the benefit of Japanese Patent Application No. 2016-010123 (filed on Jan. 21, 2016). The content of which is incorporated by reference herein in their entirety.

FIELD

The present invention relates to a radio terminal and a network apparatus used in a mobile communication system.

BACKGROUND

In the Third Generation Partnership Project (3GPP) that is a standardization project of a mobile communication system, multimedia broadcast multicast service (MBMS) transmission technology is specified to provide multicast/broadcast services. In the MBMS transmission, multicast broadcast single frequency network (MBSFN) transmission or single cell point-to-multipoint (SC-PTM) transmission is used.

In the MBSFN transmission, multicast/broadcast data is transmitted via a physical multicast channel (PMCH) in units of MBSFN areas provided with a plurality of cells.

In this regard, in the SC-PTM transmission, multicast data is transmitted via a physical downlink shared channel (PDSCH) in units of cells. As compared with the MBSFN transmission, the SC-PTM transmission can efficiently provide a group communication service (multicast service).

On the other hand, discontinuous reception (DRX) is specified as an intermittent reception technique for reducing power consumption of a radio terminal. In an DRX operation, a radio terminal in a radio resource control (RRC) idle mode monitors paging in paging occasion occurring at a predetermined time interval (DRX cycle).

In recent years, machine type communication (MTC), in which a radio terminal communicates without intervention of a person in a mobile communication system, has attracted attention. From this background, extended DRX having a very long DRX cycle has been introduced so as to further save power of the radio terminal.

Therefore, it is desirable to realize a technology that enables an MBMS to be appropriately received in a radio terminal performing such a power saving operation.

SUMMARY

A radio terminal according to an embodiment includes a controller configured to perform a discontinuous reception (DRX) operation for multimedia broadcast multicast service (MBMS) transmission. The controller performs the DRX operation by using an MBMS reception opportunity based on hyper system frame number (H-SFN).

A network apparatus according to an embodiment is a network apparatus in a mobile communication system in which a radio terminal performs a discontinuous reception (DRX) operation for multimedia broadcast multicast service (MBMS) transmission. The network apparatus includes a controller configured to determine an MBMS reception opportunity based on hyper system frame number (H-SFN) as an MBMS reception opportunity in the DRX operation.

DESCRIPTION OF EMBODIMENTS

Summary of Embodiments

Figure 1:
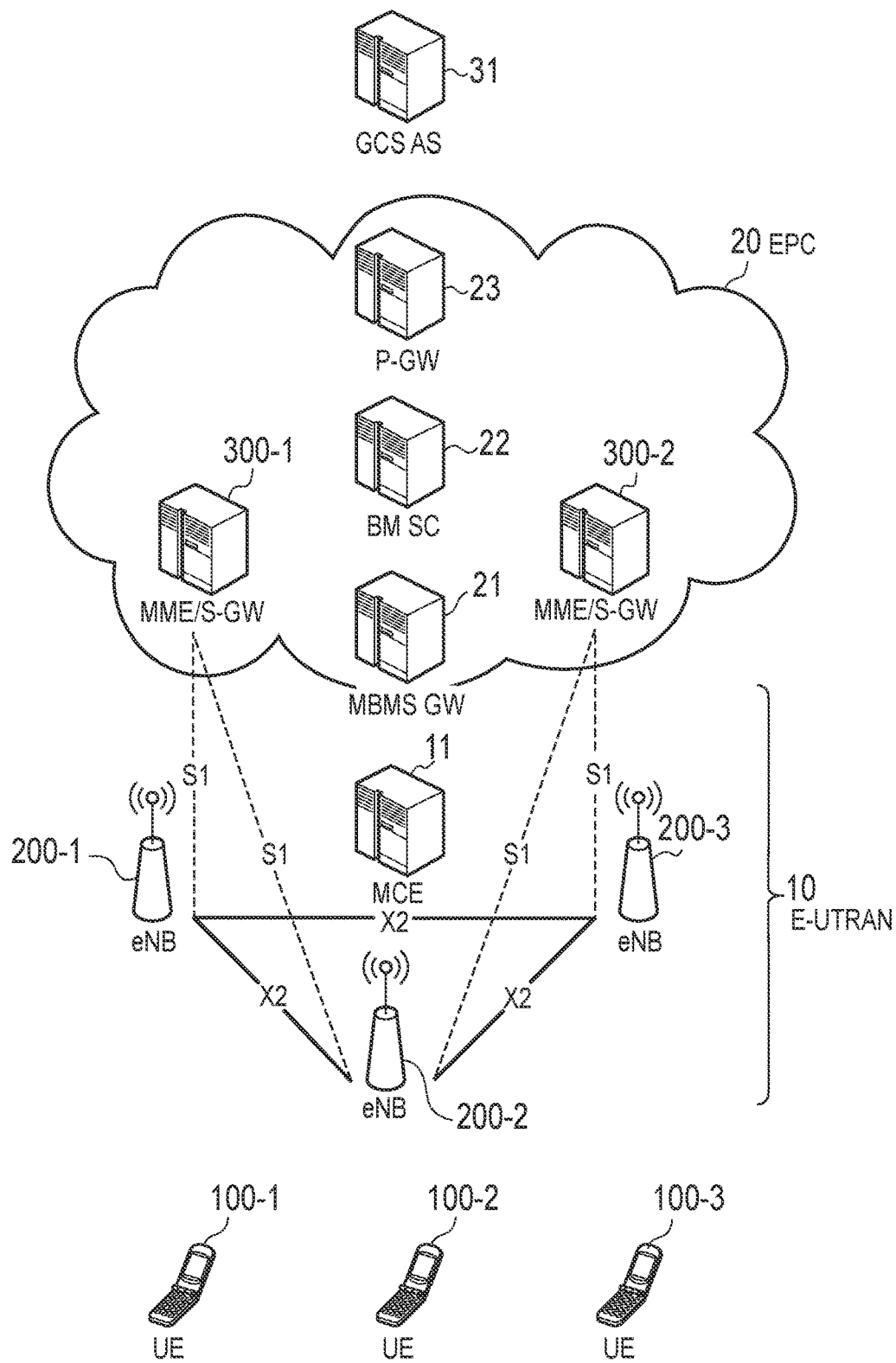
FIG. 1 is a diagram illustrating an architecture of an LTE system according to an embodiment.

A radio terminal according to an embodiment includes a controller that performs a discontinuous reception (DRX) operation for multimedia broadcast multicast service (MBMS) transmission. The controller performs the DRX operation by using an MBMS reception opportunity based on hyper system frame number (H-SFN).

The MBMS transmission may be a single cell point-to-multipoint (SC-PTM) transmission, and the MBMS reception opportunity may be an SC-PTM reception opportunity.

The SC-PTM reception opportunity may include at least one of a single cell multicast control channel (SC-MCCH) reception opportunity and a single cell multicast traffic channel (SC-MTCH) reception opportunity.

The controller may determine a specific H-SFN including the MBMS reception opportunity by using a predetermined value, and the predetermined value may include a value associated with a MBMS service received by the radio terminal.

The controller may continue a state in which a physical downlink control channel (PDCCH) can be monitored within a specific H-SFN period including the MBMS reception opportunity.

If the radio terminal receives, from a base station, information indicating that the MBMS reception opportunity based on the H-SFN is applied, the controller may apply the MBMS reception opportunity based on the H-SFN.

A core network apparatus according to a modification of the embodiment includes a controller that notifies a radio access network apparatus of an identifier associated with the MBMS service received by the radio terminal to which a power saving operation is configured.

Here, the core network apparatus is an apparatus (entity) provided in the core network. In the case of the LTE system, the core network apparatus is, for example, a mobility management entity (MME). However, the core network apparatus may be an apparatus that is different from the MME.

In addition, the radio access network apparatus is an apparatus (entity) provided in the radio access network. In the case of the LTE system, the radio access network apparatus is an evolved Node-B (eNB) or a multi-cell/multicast coordinating entity (MCE).

A network apparatus according to another embodiment is a network apparatus in a mobile communication system in which a radio terminal performs a discontinuous reception (DRX) operation for multimedia broadcast multicast service (MBMS) transmission. The network apparatus includes a controller that determines an MBMS reception opportunity based on hyper system frame number (H-SFN) as an MBMS reception opportunity in the DRX operation.

Here, the network apparatus is an apparatus (entity) provided in a core network or a radio access network. In the case of the LTE system, the network apparatus is an eNB, an MME, an MCE, a broadcast multicast service center (BM-SC), a group communication service application server (GCS-AS), a service capability server (SCS), or the like.

Embodiment

Hereinafter, an architecture of an LTE system that is a mobile communication system according to an embodiment will be described.

(System Architecture)

Figure 2:
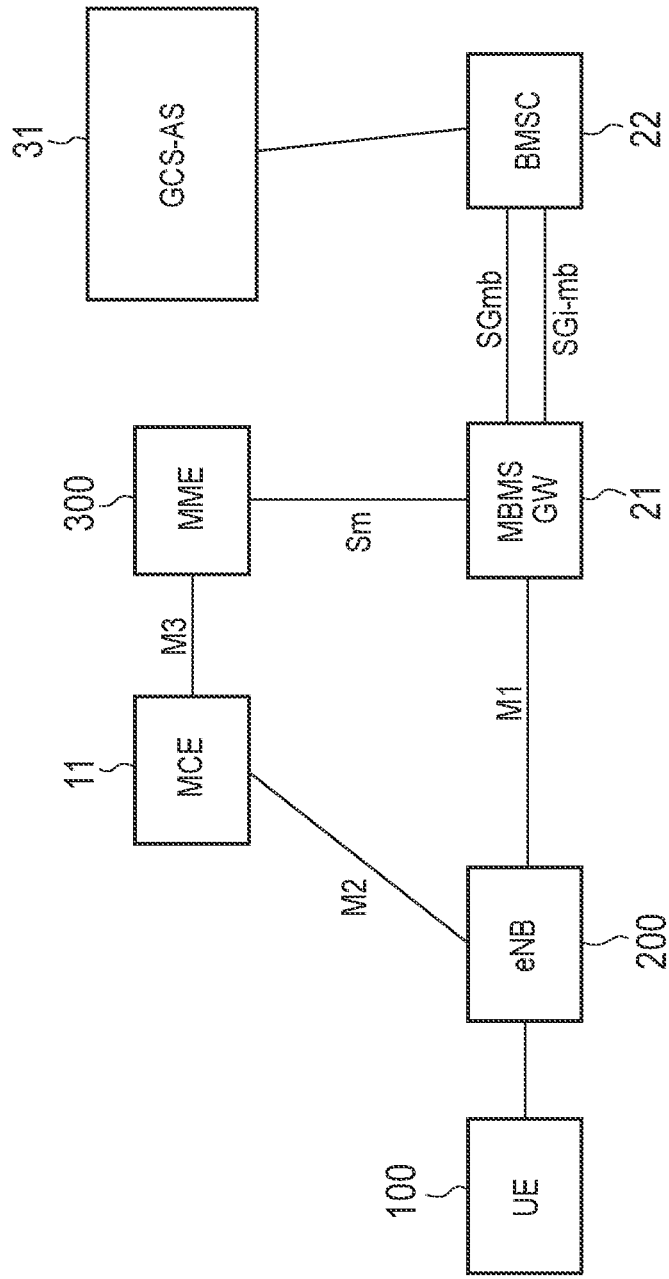
FIG. 2 is a diagram illustrating a network architecture relating to an MBMS.

FIG. 1 is a diagram illustrating a configuration of an LTE system according to an embodiment. FIG. 2 is a diagram illustrating a network architecture relating to an MBMS.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication apparatus and performs radio communication with a cell (serving cell). The architecture of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The architecture of the eNB 200 will be described later.

The eNB 200 manages one or more cells and performs radio communication with the UE 100 having established the connection to the cell. The eNB 200 has a radio resource management (RRM) function, a user data (hereinafter, simply referred to as "data") routing function, a measurement control function for mobility control and scheduling, and the like. The "cell" is used as the term indicating a minimum unit of a radio communication area and is also used as the term indicating a function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs data transfer control. The MME/S-GW 300 is connected to the eNB 200 via an S1 interface. The E-UTRAN 10 and the EPC 20 constitute the network of the LTE system.

In addition, the E-UTRAN 10 includes a multi-cell/multicast coordinating entity (MCE) 11. The MCE 11 is connected to the eNB 200 via an M2 interface and is connected to the MME 300 via an M3 interface (see FIG. 2). The MCE 11 performs MBSFN radio resource management and allocation. Specifically, the MCE 11 performs scheduling of MBSFN transmission. In this regard, scheduling of SC-PTM transmission is performed by the eNB 200.

The EPC 20 includes an MBMS gateway (MBMS GW) 21. The MBMS GW 21 is connected to the eNB 200 via an M1 interface, connected to the MME 300 via an Sm interface, and connected to the BM-SC 22 via SG-mb and SGi-mb interfaces (see FIG. 2). The MBMS GW 21 performs IP multicast data transmission, session control, or the like with respect to the eNB 200.

In addition, the EPC 20 includes a broadcast multicast service center (BM-SC) 22. The BM-SC 22 is connected to the MBMS GW 21 via SG-mb and SGi-mb interfaces and is connected to the P-GW 23 via an SGi interface (see FIG. 2). The BM-SC 22 manages and allocates temporary mobile group identity (TMGI).

Furthermore, a group communication service application server (GCS AS) 31 is provided in the network outside the EPC 20 (that is, the Internet). The GCS AS 31 is an application server for group communication. The GCS AS 31 is connected to the BM-SC 22 via MB2-U and MB2-C interfaces and is connected to the P-GW 23 via an SGi interface. The GCS AS 31 performs group management, data distribution, or the like in group communication.

(Architecture of Radio Protocol)

Figure 3:
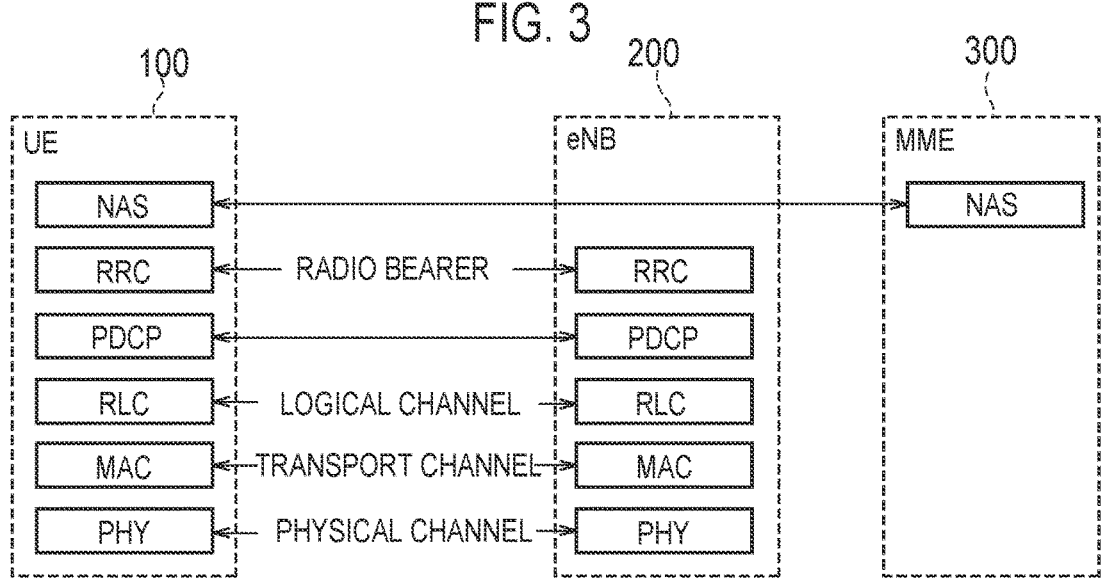
FIG. 3 is a protocol stack diagram of a radio interface in the LTE system.

FIG. 3 is a protocol stack diagram of a radio interface in the LTE system.

As illustrated in FIG. 3, a radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode; otherwise, the UE 100 is in an RRC idle mode.

A non-access stratum (NAS) layer, which is located above the RRC layer, performs session management, mobility management, and the like.

(Architecture of Radio Frame)

Figure 4:
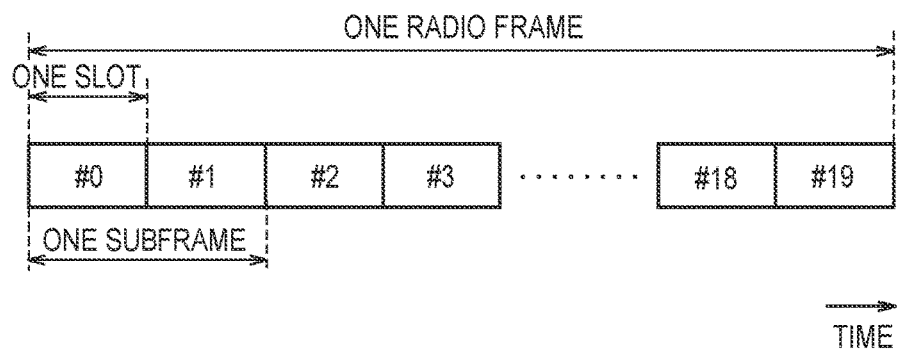
FIG. 4 is a diagram illustrating an architecture of a radio frame in the LTE system.

FIG. 4 is a diagram illustrating an architecture of a radio frame in the LTE system. In the LTE system, orthogonal frequency division multiple access (OFDMA) is applied to downlink, and single carrier frequency division multiple access (SC-FDMA) is applied to uplink.

As illustrated in FIG. 4, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a PDCCH for transmitting a downlink control signal. In addition, the remaining portion of each subframe is a region that is mainly used as a PDSCH for transmitting downlink data. In addition, in the downlink, an MBSFN subframe that is a subframe for MBSFN transmission can be set.

In the uplink, both end portions of each subframe in the frequency direction are a region that is mainly used as a PUCCH for transmitting an uplink control signal. The remaining portion of each subframe is a region that is mainly used as a PUSCH for transmitting uplink data.

(Channel Configuration of Downlink)

Figure 5A:
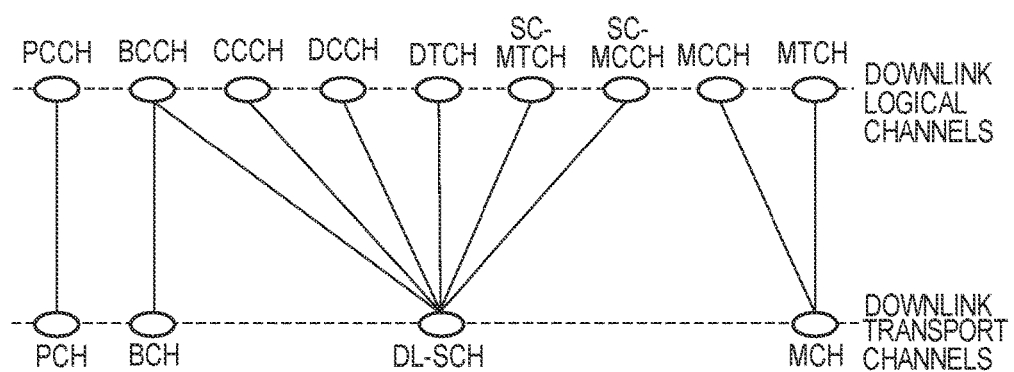
FIGS. 5A and 5B are diagrams illustrating a configuration of a downlink channel in the LTE system.
Figure 5B:
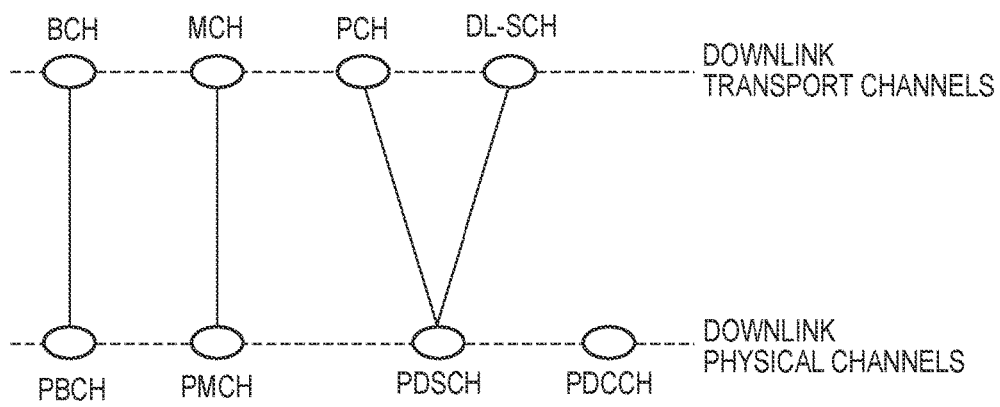

FIGS. 5A and 5B are diagrams illustrating a configuration of a downlink channel in the LTE system.

FIG. 5A illustrates a mapping between a logical channel (downlink logical channel) and a transport channel (downlink transport channel).

As illustrated in FIG. 5A, paging control channel (PCCH) is a logical channel for notifying paging information and system information change. The PCCH is mapped to a paging channel (PCH) that is a transport channel.

A broadcast control channel (BCCH) is a logical channel for system information. The BCCH is mapped to a transport channel, a broadcast control channel (BCH), and a downlink shared channel (DL-SCH).

The common control channel (CCCH) is a logical channel for transmission control information between the UE 100 and the eNB 200. The CCCH is used if the UE 100 does not have an RRC connection to the network. The CCCH is mapped to the DL-SCH.

The dedicated control channel (DCCH) is a logical channel for transmitting individual control information between the UE 100 and the network. The DCCH is used if the UE 100 has an RRC connection. The DCCH is mapped to the DL-SCH.

A dedicated traffic channel (DTCH) is a dedicated logical channel for data transmission. The DTCH is mapped to the DL-SCH.

A single cell multicast traffic channel (SC-MTCH) is a logical channel for SC-PTM transmission. The SC-MTCH is a point-to-multipoint downlink channel for transmitting data from the network to the UE 100 by using the SC-PTM transmission.

A single cell multicast control channel (SC-MCCH) is a logical channel for the SC-PTM transmission. The SC-MTCH is a point-to-multipoint downlink channel for transmitting MBMS control information for one or more SC-MTCHs from the network to the UE 100. The SC-MCCH is used only for the UE 100 that receives the MBMS by using SC-PTM or is interested in receiving the MBMS. In addition, only one SC-MCCH exists in one cell.

A multicast control channel (MCCH) is a logical channel for MBSFN transmission. The MCCH is used for transmission of MBMS control information for MTCH from the network to the UE 100. The MCCH is mapped to a multicast channel (MCH) that is a transport channel.

A multicast traffic channel (MTCH) is a logical channel for MBSFN transmission. The MTCH is mapped to the MCH.

FIG. 5B illustrates a mapping between a transport channel (downlink transport channel) and a physical channel (downlink physical channel).

As illustrated in FIG. 5B, a BCH is mapped to a physical broadcast channel (PBCH).

An MCH is mapped to a physical multicast channel (PMCH). The MCH supports MBSFN transmission by a plurality of cells.

A PCH and a DL-SCH are mapped to a physical downlink shared channel (PDSCH). The DL-SCH supports HARQ, link adaptation, and dynamic resource allocation.

The PDCCH carries resource allocation information of the PDSCH (DL-SCH, PCH) and HARQ information about the DL-SCH. In addition, the PDCCH carries an uplink scheduling grant.

(Architecture of Radio Terminal)

Figure 6:
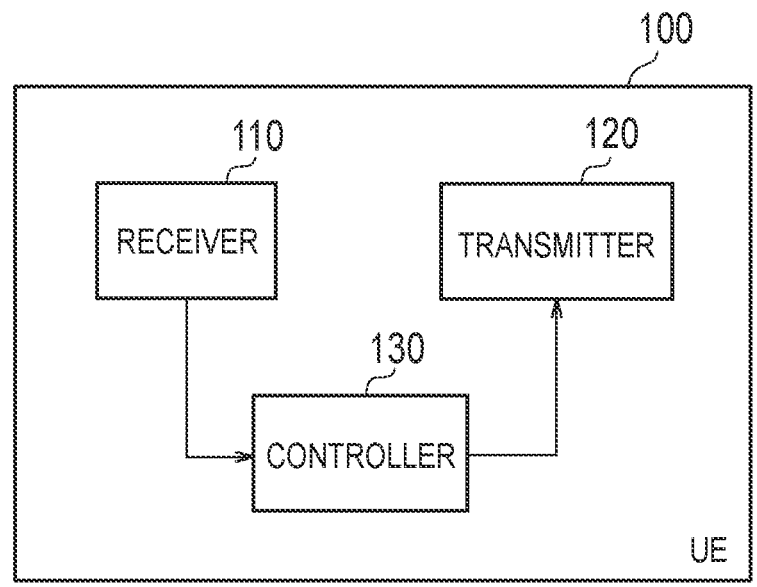
FIG. 6 is a diagram illustrating an architecture of a UE (radio terminal) according to an embodiment.

FIG. 6 is a diagram illustrating an architecture of a UE 100 (radio terminal) according to an embodiment.

As illustrated in FIG. 6, the UE 100 includes a receiver 110, a transmitter 120, and a controller 130.

The receiver 110 performs a variety of reception under the control of the controller 130. The receiver 110 includes an antenna and a receiver. The receiver converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitter. The transmitter converts a baseband signal (transmission signal) output by the controller 130 into a radio signal and transmits the radio signal from the antenna.

The controller 130 performs a variety of control on the UE 100. The controller 130 includes a processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor may include a codec that performs coding and decoding of an audio or video signal. The processor performs the various processes described above and various processes to be described later.

(Architecture of Base Station)

Figure 7:
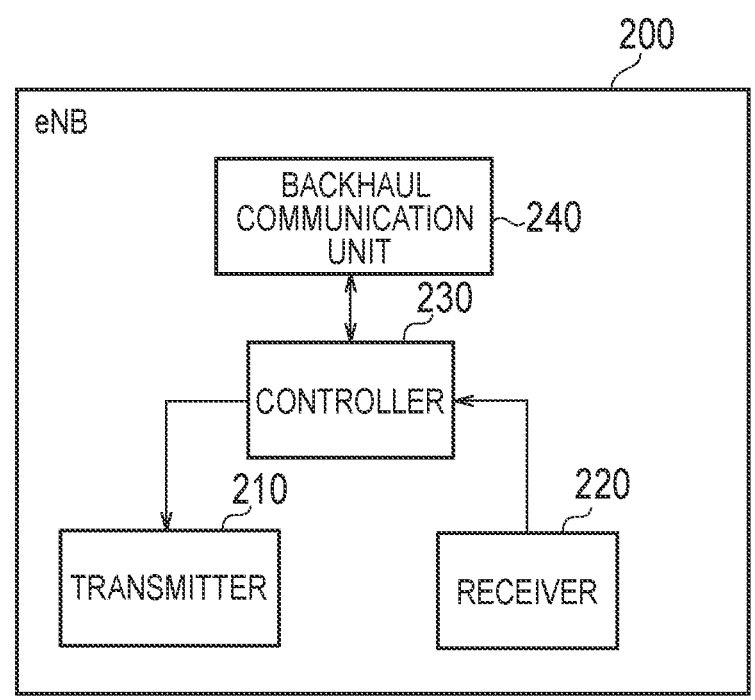
FIG. 7 is a diagram illustrating an architecture of an eNB (base station) according to an embodiment.

FIG. 7 is a diagram illustrating an architecture of an eNB 200 (base station) according to an embodiment.

As illustrated in FIG. 7, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitter. The transmitter converts a baseband signal (transmission signal) output by the controller 230 into a radio signal and transmits the radio signal from the antenna.

The receiver 220 performs a variety of reception under the control of the controller 230. The receiver 220 includes an antenna and a receiver. The receiver converts a radio signal received by the antenna into a baseband signal (reception signal) and outputs the baseband signal to the controller 230.

The controller 230 performs a variety of control on the eNB 200. The controller 230 includes a processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs the various communication protocols described above and various processes to be described later.

The backhaul communication unit 240 is connected to the neighbour eNB via an X2 interface and connected to the MME/S-GW 300 via an S1 interface. The backhaul communication unit 240 is used for communication performed on the X2 interface, communication performed on the S1 interface, and the like.

(Summary of DRX)

Figure 8:
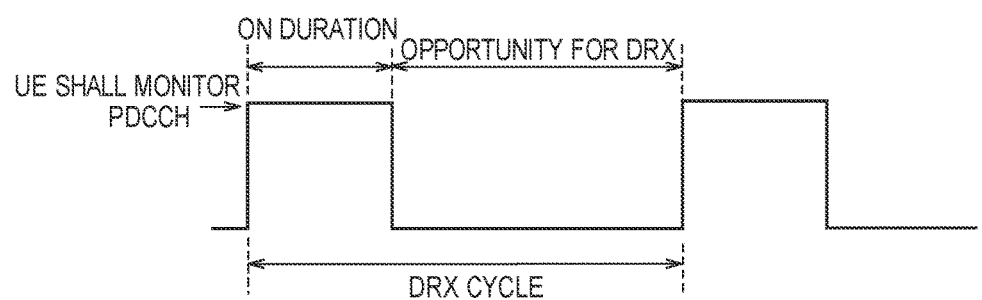
FIG. 8 is a diagram illustrating a DRX operation of the UE.

The summary of the DRX will be described below. FIG. 8 is a diagram illustrating the DRX operation of the UE 100. In the embodiment, the DRX in the RRC idle mode is assumed.

As illustrated in FIG. 8, the UE 100 can perform the DRX operation so as to reduce power consumption. The UE 100 that performs the DRX operation intermittently monitors a PDCCH. Generally, the PDCCH in a subframe carries scheduling information (radio resource and transport format information) of the PDSCH in the subframe. Since it is possible to turn off the receiver of the UE 100 in a period (sleep period) in which the PDCCH is not monitored, the power consumption of the UE 100 is reduced. Although "On Duration" in which the UE 100 shall monitor the PDCCH is illustrated in FIG. 8, it should be noted that in the DRX in the RRC idle mode, a subframe corresponding to "Paging Occasion (PO)" is set instead of "On Duration".

In the DRX operation, the UE 100 intermittently monitors the PDCCH so as to receive a paging mainly for notifying an incoming call. The UE 100 decodes the PDCCH by using a group identifier (P-RNTI) for the paging and acquires paging channel allocation information. The UE 100 acquires a paging message based on the allocation information. A PDCCH monitoring timing in the UE 100 is determined based on an identifier (IMSI: international mobile subscriber identity) of the UE 100. The calculation of the PDCCH monitoring timing will be specifically described.

The PDCCH monitoring timing (PDCCH monitoring subframe) in the DRX operation is referred to as paging occasion (PO). The PO corresponds to a paging reception opportunity.

The UE 100 and the eNB 200 calculate paging occasion (PO) and a paging frame (PF) that is a radio frame including paging occasion as follows.

A system frame number (SFN) of PF is obtained from the following equation (1).

$$\text{SFN mod } T = (T \text{ div } N) * (UE\_ID \text{ mod } N) \quad (1)$$

It should be noted that T is the DRX cycle of the UE 100 for monitoring paging and is expressed by the number of radio frames. In addition, T is the smaller one of a default DRX value the eNB 200 broadcasts by a system information block (SIB) and a UE-specific DRX value configured to the UE 100 by the NAS message. If the UE-specific DRX value is not configured, the UE 100 applies the default DRX value. In addition, N is the minimum value of T and nB. nB is a value selected from among 4T, 2T, T, T/2, T/4, T/8, T/16, and T/32. UE_ID is a value obtained by "IMSI mod 1024".

Among the PFs obtained in the above manner, the subframe number of PO is obtained as follows. First, the index i_s is obtained by the following equation (2).

$$i\_s = \text{floor}(UE\_ID/N) \text{ mod } Ns \quad (2)$$

Ns is the maximum value from among 1 and nB/T.

Next, PO corresponding to Ns and the index i_s is obtained from Table 1 or Table 2. Table 1 is applied to an LTE FDD system, and Table 2 is applied to an LTE TDD system. In Table 1 and Table 2, N/A represents non-application.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In the PO (paging occasion) of the PF calculated in this way, the UE 100 monitors paging (specifically, PDCCH). If it is necessary to transmit the paging to the UE 100, the eNB 200 transmits the paging addressed to the UE 100 at the PO (paging occasion) of the PF.

Next, the extended DRX will be described. In extended DRX, a hyperframe is used for supporting a very long DRX cycle.

Figure 9:
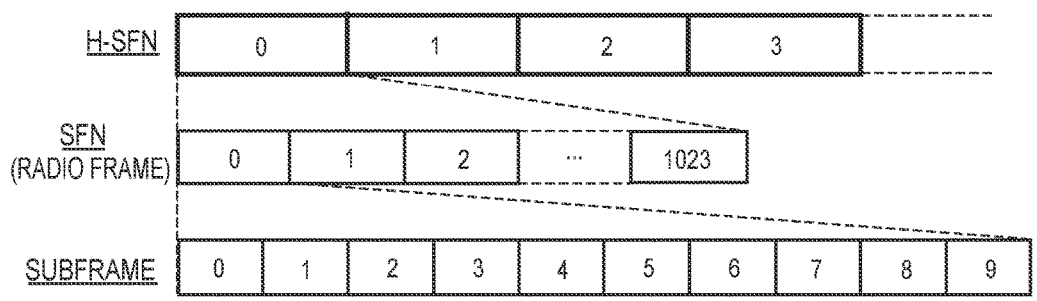
FIG. 9 is a diagram illustrating a relationship between a hyperframe, a radio frame, and a subframe.

FIG. 9 is a diagram illustrating a relationship between a hyperframe, a radio frame, and a subframe. The hyperframe is identified by a hyper system frame number (H-SFN). The H-SFN is notified from the cell. The radio frame is identified by a system frame number (SFN). The subframe is identified by a subframe number. As illustrated in FIG. 9, one hyperframe is constituted by 1024 radio frames. System frame numbers from 0 to 1023 are allocated to the 1024 radio frames. In addition, one radio frame is constituted by ten subframes. Subframe numbers from 0 to 9 are allocated to the ten subframes.

If the cell indicates the support of the extended DRX by system information, the UE 100 in which the extended DRX cycle is configured performs an extended DRX operation. The UE 100 monitors the above-mentioned PO within a periodic paging window configured to the UE. The paging window is UE-specific. The paging window is defined by a paging hyperframe (PH), a start point (PW_start) in the PH, and an end point (PW_end) in the PH.

Here, the PH is an H-SFN satisfying the following equation (3).

$$H\text{-}SFN \bmod T_{eDRX,H} = (UE\_ID \bmod T_{eDRX,H}) \quad (3)$$

UE_ID is "IMSI mod 1024". $T_{eDRX,H}$ is an extended DRX cycle (eDRX cycle) configured to the UE 100.

PW_start indicates the first radio frame of the paging window and is an SFN satisfying the following equation (4).

$$SFN = 256 * i_{eDRX} \quad (4)$$

$i_{eDRX}$ is "floor(UE_ID/$T_{eDRX,H}$) mod 4".

PW_end indicates the last radio frame of the paging window and is an SFN satisfying the following equation (5).

$$SFN = (PW\_start + L*100 - 1) \bmod 1024 \quad (5)$$

L is a paging window length configured to the UE 100.

(Summary of SC-PTM)

Figure 10:
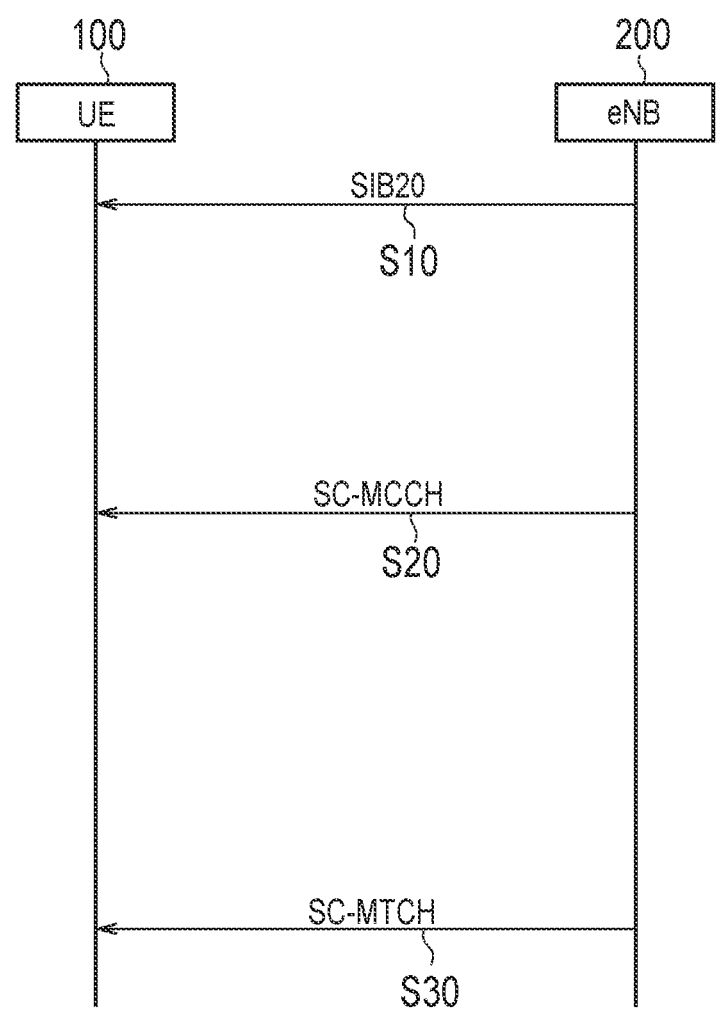
FIG. 10 is a diagram illustrating a summary of an operation of a general SC-PTM.

The summary of the SC-PTM will be described below. FIG. 10 is a diagram illustrating the summary of the operation of the general SC-PTM.

As illustrated in FIG. 10, in step S10, the eNB 200 transmits an SIB 20 (system information block type 20) via the BCCH. The UE 100 receives the SIB 20.

The SIB 20 includes information necessary for acquiring control information (specifically, SC-MCCH) relating to MBMS transmission using the SC-PTM. For example, the SIB 20 includes sc-mcch-ModificationPeriod indicating a cycle at which the contents of the SC-MCCH can be changed, sc-mcch-RepetitionPeriod indicating the transmission (retransmission) time interval of the SC-MCCH by the number of radio frames, sc-mcch-Offset indicating the offset of the radio frame to which the SC-MCCH is scheduled, and sc-mcch-Subframe indicating the subframe to which the SC-MCCH is scheduled.

In step S20, the eNB 200 transmits SCPTM configuration information via the SC-MCCH. The UE 100 receives the SCPTM configuration information. In the PHY layer, single cell RNTI (SC-RNTI) is used for SC-MCCH transmission.

The SCPTM configuration information includes control information that is applicable to the MBMS service transmitted via a single cell MBMS point to multipoint radio bearer (SC-MRB). The SCPTM configuration information includes sc-mtch-InfoList including the configuration of each SC-MTCH in a cell that transmits the corresponding information, and scptmNeighbourCellList that is a list of neighbour cells providing the MBMS service via the SC-MRB.

The sc-mtch-InfoList includes one or more SC-MTCH-Info. Each SC-MTCH-Info includes information (mbmsSessionInfo) about an ongoing MBMS session transmitted via the SC-MRB, group RNTI (G-RNTI) corresponding to the MBMS session, and sc-mtch-schedulingInfo that is DRX information for SC-MTCH. The mbmsSessionInfo includes a TMGI and a session ID (sessionId) that identify the MBMS service. The G-RNTI is an RNTI that identifies a multicast group (specifically, an SC-MTCH addressed to a specific group). The G-RNTI is mapped to the TMGI in a one-to-one manner.

The sc-mtch-schedulingInfo includes onDurationTimerSCPTM, drx-InactivityTimerSCPTM, and schedulingPeriodStartOffsetSCPTM. The schedulingPeriodStartOffsetSCPTM includes SC-MTCH-SchedulingCycle and SC-MTCH-SchedulingOffset.

Here, the DRX for the SC-PTM transmission will be described. The DRX for the SC-PTM transmission is an operation independent of the above-described DRX. The UE 100 in which the DRX for the SC-PTM transmission is configured intermittently monitors the PDCCH by using the corresponding G-RNTI in the RRC connected mode or the RRC idle mode. If onDurationTimerSCPTM or drx-InactivityTimerSCPTM is running, it is an active time. The UE 100 monitors the PDCCH at the active time. In addition, if "[(SFN*10)+subframe number] modulo (SC-MTCH-SchedulingCycle)=SC-MTCH-Scheduling Offset" is satisfied, the UE 100 starts onDurationTimerSCPTM. If the PDCCH indicates the DL transmission, the UE 100 starts the drx-InactivityTimerSCPTM.

In step S30, the eNB 200 transmits multicast data (MBMS data) via the SC-MTCH. In the PHY layer, the eNB 200 transmits the PDCCH by using the G-RNTI and then transmits the multicast data via the PDSCH. The UE 100 receives multicast data.

In such a SC-PTM operation, the sc-mcch-ModificationPeriod is a maximum of 10.24 seconds (rf1024). In addition, the change notification of the contents of the SC-MCCH is performed by the PDCCH by using the SC-N-RNTI that is the RNTI for the notification, but the PDCCH is transmitted only by the same subframe as the SC-MCCH. Therefore, the UE 100 has to monitor the PDCCH by using the SC-N-RNTI at least once every 10.24 seconds.

In addition, the SC-MTCH-SchedulingCycle has a maximum of 1.024 seconds (sf1024). Therefore, the UE 100 has to monitor the PDCCH by using the G-RNTI at least once every 1.024 seconds.

Here, it is assumed that the UE 100 that performs the extended DRX operation performs the SC-PTM reception. In this case, although the extended DRX is configured to the UE 100, the UE 100 has to frequently monitor the PDCCH. Therefore, it is difficult to obtain the effect of power saving by the extended DRX.

(Operation According to Embodiment)

An operation according to an embodiment will be described below.

The UE 100 according to the embodiment performs the DRX operation for the SC-PTM transmission in the RRC idle mode. In the DRX operation for the SC-PTM transmission, the UE 100 determines the SC-PTM reception opportunity based on the H-SFN. As such, a new SC-PTM reception opportunity corresponding to the extended DRX is introduced, and thus it is possible to enable the SC-PTM reception while achieving the power saving effect by the extended DRX.

The SC-PTM reception opportunity based on the H-SFN is preferably applied only when the extended DRX is configured to the UE 100. However, the SC-PTM reception opportunity based on the H-SFN may also be applicable when the extended DRX is not configured to the UE 100. For example, the SC-PTM reception opportunity based on the H-SFN may be applied when a power saving mode (PSM) is configured to the UE 100. Details of the PSM will be described later.

In an embodiment, the SC-PTM reception opportunity includes at least one of an SC-MCCH reception opportunity and an SC-MTCH reception opportunity. In other words, the UE 100 determines the SC-MCCH reception opportunity and/or the SC-MTCH reception opportunity based on the H-SFN in the DRX operation for the SC-PTM transmission.

In an embodiment, the UE 100 determines a specific H-SFN including the SC-PTM reception opportunity by using a predetermined value (M, N). For example, the UE 100 performs the SC-PTM reception (SC-MCCH reception and/or SC-MTCH reception) in a specific H-SFN that satisfies the following equation (6).

$$H\text{-}SFN \bmod M = N \qquad (6)$$

Here, it should be noted that, unlike the calculation formula of the PH shown in equation (3), equation (6) does not use a value unique to the UE 100 (IMSI or the like).

M and N are configured (broadcast/multicast) to the UE 100 from the eNB 200 by the SIB 20 or the SC-MCCH.

Alternatively, M and N may be configured in advance. For example, if M and N are configured in advance as M=256 and N=0, it can be an SC-PTM reception opportunity similar to the paging occasion in the extended DRX.

In an embodiment, $M_{SC\text{-}MCCH}$ and $N_{SC\text{-}MCCH}$ for SC-MCCH reception opportunity and $M_{SC\text{-}MCCH}$ and $N_{SC\text{-}MCCH}$ for SC-MTCH reception opportunity may be separately configured. In this case, the $M_{SC\text{-}MCCH}$ and the $N_{SC\text{-}MCCH}$ for the SC-MTCH reception opportunity may be separately configured for each TMGI (G-RNTI). That is, the $M_{SC\text{-}MCCH}$ and the $N_{SC\text{-}MCCH}$ for the SC-MTCH reception opportunity may be values associated with the MBMS service (MBMS session) received by the UE.

In an embodiment, the UE 100 continues an active state in which the PDCCH can be monitored within the determined period of the specific H-SFN (hyperframe). Meanwhile, the UE 100 may determine the SC-PTM reception opportunity (SC-MCCH reception opportunity and/or SC-MTCH reception opportunity) according to the general SC-PTM operation as described above (see FIG. 10). Alternatively, the above-described paging window may be configured within the determined period of the specific H-SFN (hyperframe) (see equations (4) and (5)).

If the UE 100 receives the PDCCH at the SC-PTM reception opportunity (if the data transmission is performed), the On duration extends similarly to the DRX in the normal RRC connected mode. If the PDCCH does not arrive during the inactivity time, the UE 100 can be turned OFF (sleep state). Here, when assuming that the SC-MTCH is continuously transmitted, it is also considered that the SC-MTCH continues to be transmitted even when the specific H-SFN ends and becomes the next H-SFN. In such a case, the reception operation takes precedence until the data reception is completed, and the operation may return to the normal operation (OFF/sleep state) from the time when the reception operation is turned OFF after the lapse of the inactivity time.

In an embodiment, the eNB 200 may transmit information indicating that the SC-PTM reception opportunity based on the H-SFN is to be applied by the SIB or the SC-MCCH. If the corresponding information is received from the eNB 200, the UE 100 applies the SC-PTM reception opportunity based on the H-SFN. If eNB 200 configures M and N to the UE 100, M and N may be regarded as information indicating that the SC-PTM reception opportunity based on H-SFN is applied.

Here, the operation in which the UE 100 determines the SC-PTM reception opportunity based on the H-SFN has mainly been described. However, the eNB 200 performs the same operation and transmits the SC-PTM in accordance with the SC-PTM reception opportunity of the UE 100 (multicast group).

(Example of Operation Flow)

An example of an operation flow according to an embodiment will be described below. A description of the operations redundant to the above-described operations will be omitted.

Figure 11:
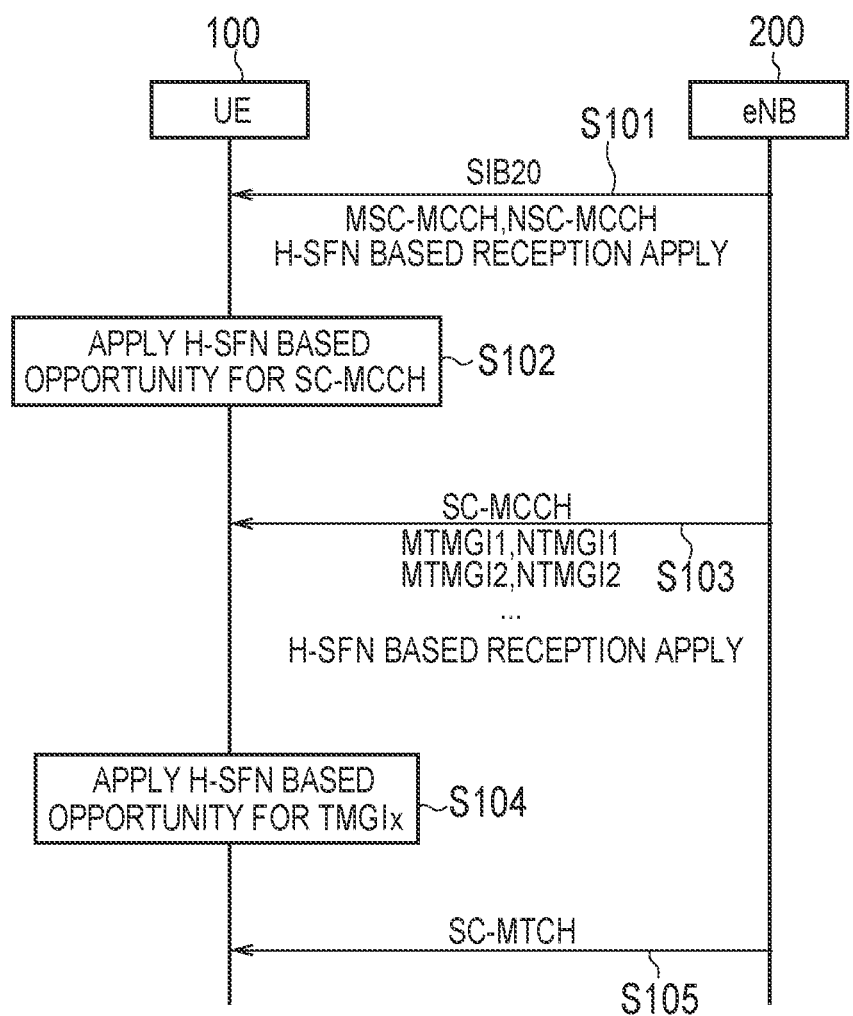
FIG. 11 is a diagram illustrating an example of an operation flow of the UE and the eNB according to an embodiment.

FIG. 11 is a diagram illustrating an example of the operation flow of the UE 100 and the eNB 200 according to an embodiment.

As illustrated in FIG. 11, in step S101, the eNB 200 transmits an SIB 20 via a BCCH. The UE 100 receives the SIB 20.

The SIB 20 includes information necessary for acquiring an SC-MCCH. In addition to the above-described information, the SIB 20 includes $M_{SC\text{-}MCCH}$ and $N_{SC\text{-}MCCH}$ for SC-MCCH reception opportunity. The SIB 20 may further include information (H-SFN based reception apply) indicating that an SC-PTM reception opportunity based on H-SFN is applied.

In step S102, the UE 100 determines the SC-MCCH reception opportunity based on the H-SFN by using the $M_{SC\text{-}MCCH}$ and the $N_{SC\text{-}MCCH}$. Specifically, the UE 100 determines a specific H-SFN including the SC-MCCH reception opportunity.

In step S103, the eNB 200 transmits SCPTM configuration information via the SC-MCCH in the SC-MCCH reception opportunity. The UE 100 receives the SCPTM configuration information at the SC-MCCH reception opportunity.

In addition to the above-described information, the SCPTM configuration information includes $M_{TMGI}$ and $N_{TMGI}$ associated with TMGI (G-RNTI). The $M_{TMGI}$ and the $N_{TMGI}$ are used to determine the SC-MTCH reception opportunity. For example, the $M_{TMGI}$ and the $N_{TMGI}$ are included in each SC-MTCH-Info. In the example of FIG. 11, the SCPTM configuration information includes $M_{TMGI1}$ and $N_{TMGI2}$ corresponding to TMGI1, $M_{TMGI2}$ and $N_{TMGI2}$ corresponding to TMGI2, . . . . The SCPTM configuration information may further include information (H-SFN based reception apply) indicating that an SC-PTM reception opportunity based on H-SFN is applied.

In step S104, the UE 100 determines the SC-MTCH reception opportunity based on the H-SFN by using the $M_{TMGI}$ and the $N_{TMGI}$ of the TMGI corresponding to the MBMS service (MBMS session) received by thee UE. Specifically, the UE 100 determines a specific H-SFN including the SC-MTCH reception opportunity. Here, the description will be given on the assumption that the TMGI of the MBMS service received by the UE 100 is TMGI1.

In step S105, the eNB 200 transmits the multicast data via the SC-MCCH corresponding to the TMGI1 at the SC-MTCH reception opportunity corresponding to the TMGI1. At the SC-MTCH reception opportunity corresponding to the TMGI1, the UE 100 receives the multicast data via the SC-MCCH corresponding to the TMGI1.

Figure 12:
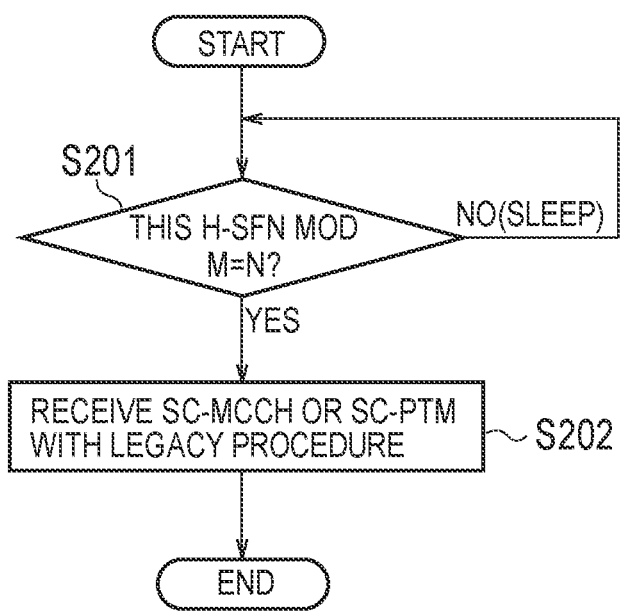
FIG. 12 is a diagram illustrating an example of a reception determination flow of the UE according to an embodiment.

FIG. 12 is a diagram illustrating an example of the reception determination flow of the UE 100 according to an embodiment.

As illustrated in FIG. 12, in step S201, the UE 100 checks whether a current H-SFN (This H-SFN) satisfies equation (6). The current H-SFN may be an H-SFN included in a SIB 1 received by the UE 100. If the current H-SFN does not satisfy equation (6) (step S201: No), the UE 100 continues a sleep state within the H-SFN period (hyperframe).

On the other hand, if the current H-SFN satisfies equation (6) (step S201: Yes), in step S202, the UE 100 performs SC-PTM reception within the H-SFN period (hyperframe).

[Modification]

In the above-described embodiment, the eNB 200 preferably grasps that the extended DRX (or PSM) in the RRC idle mode is configured, and the UE 100 that performs the SC-PTM reception exists in the cell. In addition, the eNB 200 preferably grasps the identifier (TMGI) corresponding to the MBMS service (MBMS session) received by the UE 100.

A core network apparatus according to the present modification notifies a radio access network apparatus of the identifier (TMGI) associated with the MBMS service received by the UE 100 to which the power saving operation in the RRC idle mode (that is, the extended DRX or the PSM) is configured. The core network apparatus is, for example, an MME 300, but may be an apparatus that is different from the MME 300. The radio access network apparatus is an eNB 200 or an MCE 11. The identifier is not limited to the TMGI, and may be a group identifier associated with the TMGI. The group identifier may be a G-RNTI.

Figure 13:
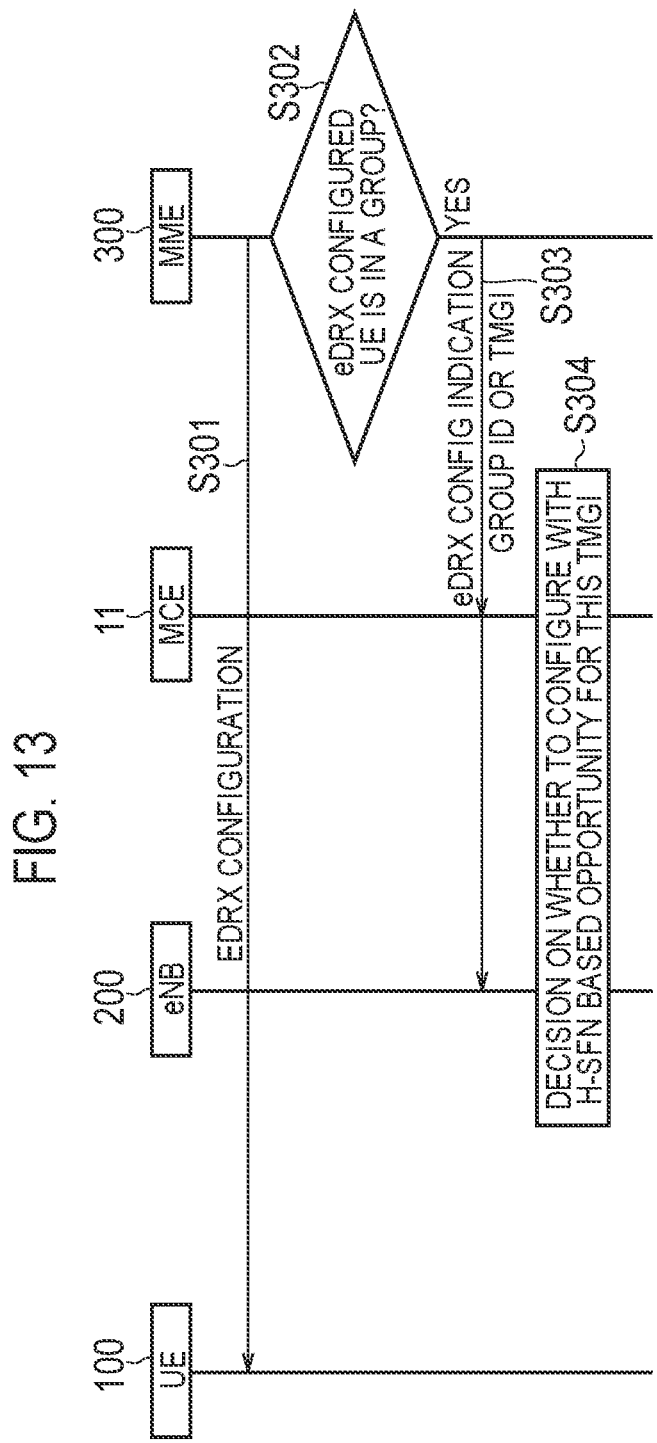
FIG. 13 is a diagram illustrating an operation flow according to a modification of the embodiment.

FIG. 13 is a diagram illustrating an example of an operation flow according to the present modification.

As illustrated in FIG. 13, in step S301, the MME 300 notifies the UE 100 of extended DRX configuration (eDRX configuration). The UE 100 configures the extended DRX.

Before or after step S301, the MME 300 grasps which UE 100 receives the MBMS service and which MBMS service the UE 100 receives by one of the following methods.

The first method is a method of transmitting information via a route of the UE 100→the GCS AS 31→the MME 300. Instead of the GCS AS 31, a service capability server (SCS) may be used (the same also applies in the second and third methods). The SCS is an apparatus that implements an M2M application. If the extended DRX is configured, the UE 100 notifies the GCS AS 31 of the fact. The GCS AS 31 notifies the MME 300 of the TMGI (or group identifier) corresponding to the UE 100 to which the extended DRX is configured. The GCS AS 31 may directly notify the MME 300, or may notify the MME 300 via a BM-SC 22 and/or an MTC-IWF (the same also applies in the second method). The MTC-IWF is an apparatus that implements a connection request to a 3GPP network, authentication of a control plane request signal, and the like.

The second method is a method of transmitting information via a route of the GCS AS 31→the MME 300. The GCS AS 31 notifies the MME 300 of a list of UEs 100 belonging to the TMGI (list of IMSIs or the like).

The third method is a method of transmitting information via a route of the UE 100→the MME 300. The UE 100 notifies the MME 300 of the TMGI of the MBMS service that the UE receives (or is interested in) at a predetermined timing. The predetermined timing is a timing before configuring the extended DRX, a timing in the process of configuring the extended DRX, or a timing after configuring the extended DRX.

In step S302, the MME 300 checks whether the UE 100 to which the extended DRX is configured exists in a multicast group.

If the UE 100 exists (step S302: Yes), in step S303, the MME 300 notifies the MCE 11 of the extended DRX configuration indication (eDRX config. indication) including the TMGI or the group identifier (group ID) corresponding to the corresponding multicast group. The MCE 11 may forward the extended DRX configuration indication to the eNB 200. Alternatively, the MME 300 may notify the eNB 200 of the extended DRX configuration indication via an S1 interface, without passing through the MCE 11.

In step S304, the eNB 200 or the MCE 11 determines whether to apply the SC-PTM reception opportunity based on the H-SFN for each multicast group (TMGI). Here, the eNB 200 or the MCE 11 can determine to apply the SC-PTM reception opportunity based on the H-SFN to the multicast group (TMGI) in which the UE 100 to which the extended DRX is configured exists. If such determination is made by the MCE 11, the determination result may be notified from the MCE 11 to the eNB 200.

It should be noted that the notification contents in step S303 may be quality of service (QoS) for each TMGI. Alternatively, an TMGI that allows high latency may be notified. In this case, the eNB 200 or the MCE 11 can determine to apply the SC-PTM reception opportunity based on the H-SFN to the multicast group (TMGI) in which the UE 100 allowing high latency is configured exists.

Other Embodiments

In the above-described embodiment, the extended DRX in the RRC connected mode has not been particularly mentioned. However, since the SC-PTM can be received by both the RRC idle mode UE and the RRC connected mode UE, the operation according to the above-described embodiment may be applied to the DRX in the RRC connected mode.

Alternatively, since the DRX cycle in the RRC connected mode has a maximum of 10.24 seconds, it is possible to receive the SC-PTM while achieving the power saving effect by extending SC-MTCH-SchedulingCycle to 10.24 seconds (sf10240)

In the above-described embodiment, the MBSFN transmission has not been particularly mentioned. However, the operation according to the above-described embodiment may be applied to the MBSFN transmission. In this case, the UE 100 that performs the DRX operation for the MBSFN transmission in the RRC idle mode (or the RRC connected mode) determines the MBSFN reception opportunity based on the H-SFN. For example, the UE 100 monitors the PDCCH in the MBSFN subframe in the H-SFN that satisfies equation (6). The SC-PTM reception opportunity and the MBSFN reception opportunity can be collectively referred to as MBMS reception opportunity.

In the above-described embodiment, an example in which the UE 100 mainly determines the MBMS reception opportunity (SC-PTM reception opportunity or MBSFN reception opportunity) has been described. However, the network apparatus may determine the MBMS reception opportunity based on the H-SFN. The network apparatus is an eNB 200, an MME 300, an MCE 11, a BM-SC 22, a GCS-AS, an SCS, or the like (see FIG. 2).

If the eNB 200 determines the MBMS reception opportunity, the eNB 200 notifies the UE 100 of the MBMS reception opportunity via the SIB 20, the SC-MCCH, or the like.

If the MME 300 determines the MBMS reception opportunity based on the H-SFN, the MME 300 notifies the UE 100 of the MBMS reception opportunity based on the H-SFN by NAS signaling. The MME 300 may notify the eNB 200 of the MBMS reception opportunity based on the H-SFN by S1 signaling, may notify the MCE 11 of the MBMS reception opportunity based on the H-SFN by M3 signaling, and may notify the eNB 200 of the MBMS reception opportunity based on the H-SFN by M2 signaling (via M3 signaling and MCE).

If the MCE 11 determines the MBMS reception opportunity based on the H-SFN, the MCE 11 notifies the UE 100 of the MBMS reception opportunity based on the H-SFN by NAS signaling (via M3 signaling and MME). The MCE 11 may notify the eNB 200 of the MBMS reception opportunity based on the H-SFN by M2 signaling, and may notify the MME 300 of the MBMS reception opportunity based on the H-SFN by M3 signaling.

If the BM-SC 22, the GCS-AS, or the SCS determines the MBMS reception opportunity based on the H-SFN, the BM-SC 22, the GCS-AS, or the SCS notifies the UE 100 of the MBMS reception opportunity based on the H-SFN by NAS signaling (via MME) or direct interface (GC1 or the like). The BM-SC 22, the GCS-AS, or the SCS may notify the eNB 200 of the MBMS reception opportunity based on the H-SFN by S1 signaling (via MME) or M1 signaling (via MBMS-GW).

In the above-described embodiment, the operation of the PSM has not been particularly mentioned. Here, the PSM will be described. First, due to negotiation between the MME 300 and the UE 100, an "active timer" (T3324) is configured from the MME 300 to the UE 100. The UE 100 starts the "active timer" upon release of the RRC connection. Like the UE 100, the MME 300 also manages the "active timer". The UE 100 applies the PSM when the "active timer" expires without data communication (for example, paging). Then, when the PSM is applied, the UE 100 starts a timer (T3412) for the PSM. The timer (T3412) may also be determined by negotiation like the "active timer". Like the UE 100, the MME 300 also manages the timer (T3412). While the timer (T3412) is running, the UE 100 enters a sleep state (ultra-low power consumption operation). The maximum value of the timer (T3412) is 12.1 days. The UE 100 performs a TAU procedure when the timer (T3412) expires.

In the above-described embodiment, the LTE system has been exemplified as the mobile communication system. However, the present invention is not limited to the LTE system. The present invention may be applied to mobile communication systems other than the LTE system.

INDUSTRIAL APPLICABILITY

The present invention is useful in the radio communication field.

The invention claimed is:
1. A radio terminal comprising:
a receiver configured to receive multimedia broadcast multicast service (MBMS) service via single cell point-to-multipoint (SC-PTM) transmission from a cell that broadcasts hyper system frame number (H-SFN) for extended discontinuous reception (eDRX) operation, the cell being managed by a base station, and
a controller configured to perform the eDRX operation for the SC-PTM transmission,
wherein the controller is configured to perform the eDRX operation by using a single cell multicast control channel (SC-MCCH) reception opportunity and a single cell multicast traffic channel (SC-MTCH) reception opportunity based on the H-SFN,
the controller is configured to determine a first specific H-SFN including the SC-MCCH reception opportunity by using a first value received from the cell,
the controller is configured to determine a second specific H-SFN including the SC-MTCH reception opportunity by using a second value received from the cell,
the second value is associated with the MBMS service received by the radio terminal.
2. The radio terminal according to claim 1, wherein
the controller is configured to continue a state in which a physical downlink control channel (PDCCH) is monitored within a specific H-SFN period including the SC-MTCH reception opportunity.
3. A communication method comprising:
receiving by a radio terminal, multimedia broadcast multicast service (MBMS) service via single cell point-to-multipoint (SC-PTM) transmission from a cell that broadcast hyper system frame number (H-SFN) for extended discontinuous reception (eDRX) operation, the cell being managed by a base station;
performing by the radio terminal, the eDRX operation for the SC-PTM transmission, by using a single cell multicast control channel (SC-MCCH) reception opportunity and a single cell multicast traffic channel (SC-MTCH) reception opportunity based on the H-SFN;
determining by the radio terminal, a first specific H-SFN including the SC-MCCH reception opportunity by using a first value received from the cell; and
determining by the radio terminal, a second specific H-SFN including the SC-MTCH reception opportunity by using a second value received from the cell,
wherein the second value is associated with the MBMS service received by the radio terminal.

* * * * *